(12) United States Patent
Dey et al.

(10) Patent No.: US 8,080,320 B2
(45) Date of Patent: Dec. 20, 2011

(54) METALLIZED LAMINATED STRUCTURE AND METHOD OF MAKING A PLASTIC ARTICLE

(75) Inventors: Subir K. Dey, Florence, SC (US); Marion H. Weatherford, Hartsville, SC (US); J. Mark Morrow, Camden, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 12/823,189

(22) Filed: Jun. 25, 2010

(65) Prior Publication Data

US 2010/0260993 A1 Oct. 14, 2010

Related U.S. Application Data

(62) Division of application No. 11/566,513, filed on Dec. 4, 2006, now Pat. No. 7,763,361.

(51) Int. Cl.
B32B 15/04 (2006.01)
B32B 15/08 (2006.01)
B32B 27/08 (2006.01)
B29C 47/00 (2006.01)

(52) U.S. Cl. .... 428/515; 428/457; 428/461; 156/244.11

(58) Field of Classification Search .................. None
See application file for complete search history.

(56) References Cited

U.S. PATENT DOCUMENTS

| | | | |
|---|---|---|---|
| 4,309,466 A * | 1/1982 | Stillman | 428/35.3 |
| 4,528,234 A | 7/1985 | Kaiho et al. | |
| 4,559,266 A | 12/1985 | Misasa et al. | |
| 5,021,500 A | 6/1991 | Puydak et al. | |
| 5,106,670 A | 4/1992 | Wyslotsky et al. | |
| 5,698,317 A | 12/1997 | Kurokawa et al. | |
| 6,346,318 B1 | 2/2002 | Panchyshyn | |
| 6,533,884 B1 | 3/2003 | Mallik | |
| 6,599,584 B2 | 7/2003 | Plester et al. | |
| 6,723,431 B2 | 4/2004 | Mallory et al. | |
| 6,803,398 B1 | 10/2004 | Ito et al. | |
| 6,863,964 B2 | 3/2005 | Migliorini et al. | |
| 2004/0067375 A1 | 4/2004 | Rassouli et al. | |
| 2005/0147835 A1 | 7/2005 | Chang et al. | |
| 2005/0170161 A1 | 8/2005 | Ramchandra et al. | |
| 2005/0175843 A1 | 8/2005 | Johnson | |

OTHER PUBLICATIONS

Vifan Product Catalogue [online] [retrieved Dec. 1, 2006] Retrieved from the Internet: <URL: http:www.vibacgroup.com>. 6 pages.
Product Data Sheet—CZW One-Sided Sealable, Metallized Biaxially Oriented Polypropylene Film [online] [retrieved Dec. 1, 2006] Retrieved from the Internet: <URL: http://www.vibacgroup.com>, 1 page.
Product Data Sheet—CZ—Side Sealable, Metallized Biaxially Oriented Polypropylene File [online] [retrieved Dec. 1, 2006] Retrieved from the Internet: <URL: http:www.vibacgroup.com>. 1 page.
Product Data Sheet—CZR One-Side Sealable, Craze-Resistant Metallized Biaxially Oriented Polypropylene Film [online] [retrieved Dec. 1, 2006] Retrieved from the Internet: <URL: http:www.vibacgroup.com>. 1 page.

* cited by examiner

*Primary Examiner* — Sheeba Ahmed
(74) *Attorney, Agent, or Firm* — Alston & Bird LLP

(57) ABSTRACT

A metallized laminated structure suitable for making a rigid container having a metallic appearance is provided. The laminated structure includes a metallized film and a thermoplastic sheet. At least a portion of the thermoplastic sheet is bonded to the metallized film through a lamination process. The metallized film includes a metallic layer, a sealable layer, and a polypropylene core between the metallic layer and the sealable layer. The thermoplastic sheet includes at least one layer of a polypropylene or a thermoplastic olefin. Or the thermoplastic sheet includes at least one layer of a polypropylene and at least one layer of a thermoplastic olefin.

15 Claims, 1 Drawing Sheet

METALLIZED LAMINATED STRUCTURE AND METHOD OF MAKING A PLASTIC ARTICLE

CROSS REFERENCE TO RELATED APPLICATIONS

This application is a divisional application of U.S. patent application Ser. No. 11/566,513, filed Dec. 4, 2006, U.S. Pat. No. 7,763,361 currently pending, the entire disclosure of which is hereby incorporated herein by reference.

BACKGROUND OF THE INVENTION

The present invention generally relates to thermoforming and more particularly to a laminate that is thermoformable, and to articles made from the thermoformed laminate.

It is often desirable to provide a metallic appearance to plastic articles, such as, but not limited to, rigid plastic food containers. One approach to achieving this objective is to make the container from a polymer that contains a metallic pigment. However, pigment is relatively expensive especially in use with disposable food containers. Another approach is to paint the container with a metallic paint. However, paint can chip or flake.

BRIEF SUMMARY OF THE INVENTION

The present invention addresses the above problem by providing a metallized laminated structure suitable for making a rigid container having a metallic appearance. The laminated structure includes a metallized film and a thermoplastic sheet. At least a portion of the metallized film is bonded to the thermoplastic sheet. The metallized film includes a metallic layer, a sealable layer, and a polypropylene core between the metallic layer and the sealable layer. The thermoplastic sheet includes at least one layer of a polypropylene and/or at least one layer of a thermoplastic olefin.

For example, the thermoplastic sheet may include one polypropylene layer between two thermoplastic olefin layers. The polypropylene layer may have a melt index of about 2.0 and each thermoplastic olefin layer may have a melt index of about 2.0 and a shore hardness of about D40. The thermoplastic sheet may have a thickness of around 40 mils to around 60 mils.

The metallic layer of the film may include a polyolefin-base resin and a vacuum-deposited metal coating, such as aluminum. The metallized film may have a thickness of about 1.5 mils.

Another aspect of the present invention is a method for making a plastic article with the metallized laminated structure. The method includes extruding the layer or layers of the thermoplastic material into the thermoplastic sheet and then laminating the metallized film to the thermoplastic sheet at a predetermined lamination temperature. After laminating the metallized film and the thermoplastic sheet into a metallized laminated structure, the structure may be thermoformed or shaped into an article, such as the body of a food container.

The lamination temperature may vary from about 300° F. to about 335° F. The step of laminating the metallized film to the thermoplastic sheet may include feeding the thermoplastic sheet and the metallized film through a roll laminator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings in which some but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention provides a laminated structure 10 suitable for thermoforming. The laminated structure 10 includes a metallized film 12 and a thermoplastic sheet 14.

Figure 1:
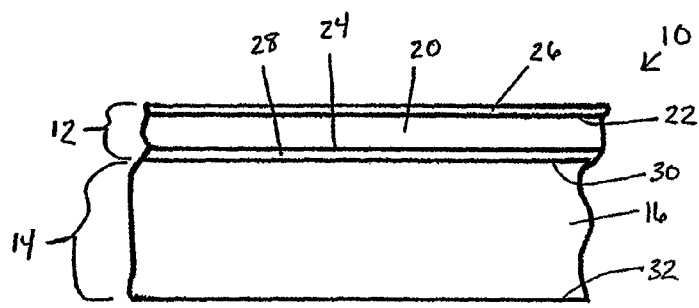
FIG. 1 is a side view of a metallized laminated structure according to an embodiment of the present invention.

The thermoplastic sheet 14 includes one or more layers of a polypropylene. For example, according to one embodiment of the present invention and as illustrated in FIG. 1, the thermoplastic sheet 14 includes one polypropylene layer 16. The polypropylene layer 16 includes a first side 30 and a second side 32. Together, the sides 30, 32 define a thickness of the layer 16. The polypropylene layer 16 is formed through an extrusion process.

Figure 2:
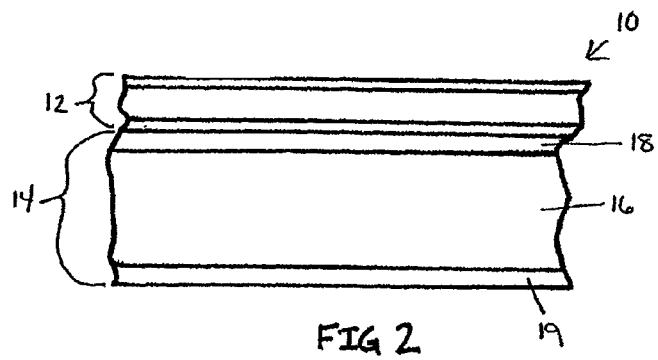
FIG. 2 is a side view of a metalized laminated structure according to another embodiment of the present invention.

The thermoplastic sheet may include one or more layers of a thermoplastic olefin in addition to or instead of the one or more polypropylene layers. A thermoplastic olefin may be prepared by melt blending polypropylene with an EPDM, a SBS or a SEBS block copolymer or copolymers along with various additives known in the art. For example, the one layer 16 in the FIG. 1 embodiment may be a layer of thermoplastic olefin instead of polypropylene. For another example and as shown in the FIG. 2 embodiment, the thermoplastic sheet includes three layers 16, 18, 19. The first and third layers 18, 19 are of a thermoplastic olefin and the second layer 16 is of a polypropylene. The one layer of the polypropylene 16 is between the two layers of the thermoplastic olefin 18, 19. Each layer includes first and second sides that define a thickness of the layer. Together the layers define the thickness of the thermoplastic sheet. The multi-layer thermoplastic sheet is formed through a co-extrusion process.

The metallized film 12 includes at least one metallic layer. The metallic layer may include a polyolefin-base resin and a metal coating. A surface of the polyolefin-base resin may be subject to a discharge treatment for promoting adhesion with the metal coating. The metal coating may be applied by a known metallizing method such as a vacuum evaporation method, a sputtering method, or a chemical vapor decomposition method. The metal coating may vary. For example, the metal in the coating could be Ag, Al, Au, Co, Cr, Fe, Ni, Zn, or various alloys.

The metallized film 12 may further include a polymer core and a sealable layer. For example, according to the embodiments illustrated in FIGS. 1 and 2 the metallized film 12 includes a polypropylene core 20, a metallic layer 26, and a sealable layer 28. The polypropylene core 20 includes a first side 22 and a second side 24. The metallic layer 26 is adjacent to the first side 22 of the polypropylene core and the sealable layer 28 is adjacent to the second side 24 of the polypropylene core. Both the metallized layer and the sealable layer define surfaces opposite the polypropylene core that together define a thickness of the metallized film.

Metallized films are commercially available. For example, the metallized film described above for the illustrated embodiments is available through the VIFAN division of the VIBAC Group.

Figure 3:
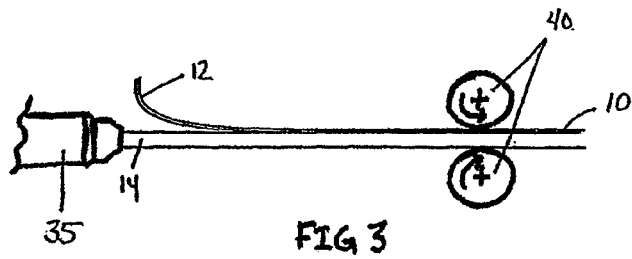
FIG. 3 is a plan view illustrating a lamination process according to an embodiment of the present invention.

The laminate structure is formed by bonding at least a portion of the metallized film to at least a portion of the thermoplastic sheet. The thermoplastic sheet and the metallized film may be bonded together through a lamination process as illustrated in FIG. 3. In general, the thermoplastic sheet and the metallized film are fed through a pair of nip rollers 40 or similar device at a predetermined lamination temperature. The temperature and the pressure from the rollers create a bond between the thermoplastic sheet and the metallized film, or more specifically between the thermoplastic sheet and the sealable layer of the metallized film, or between the thermoplastic sheet and the metallic layer of the metallized film. The lamination process may occur in-line with the extrusion machine 35 that forms the thermoplastic sheet, as shown in FIG. 3. For example, the nip region of the polishing roll in a conventional extrusion process may be used as a lamination roll to bond the thermoplastic sheet and the metallized film together. Alternatively, the bonding of the thermoplastic sheet and the metallized film may be done off-line from the extrusion process.

The lamination temperature, the thicknesses of the metallized film and of the thermoplastic sheet and the characteristics of the materials of the metallized film and the thermoplastic sheet contribute to the bond strength between the metallized film and the thermoplastic sheet.

For example, in one embodiment, the thermoplastic sheet has a thickness of about 40 mils and includes two thermoplastic olefin layers and one polypropylene layer between the two thermoplastic olefin layers {TPO/PP/TPO}. Each thermoplastic olefin layer has a thickness of about 5 mils and shore hardness of about D40. The polypropylene is a copolymer having a melt index of 2.0, as per ASTM D1238. The metallized film is a CXM grade film from VIFAN that has a thickness of about 1.5 mil thickness and includes a polypropylene core between a sealable layer and a metallic layer with vacuum deposited aluminum. The thermoplastic sheet and the metallized film may be bonded together at a lamination temperature of about 300° F.

In another embodiment, the thermoplastic sheet has a thickness of about 60 mils and includes one polypropylene layer. The polypropylene is a copolymer having a melt index of 2.0. The metallized film is a CXM grade film from VIFAN that has a thickness of about 1.5 mil thickness and includes a polypropylene core between a sealable layer and a metallic layer with vacuum deposited aluminum. The thermoplastic sheet and the metallized film may be bonded together at lamination temperatures from about 300° F. to about 335° F.

Although the embodiments above generally describe a metallized film having a sealable layer, in other embodiments of the present invention the metallized film may not have a separate sealable layer. As disclosed above, the thermoplastic sheet may be bonded directly to the metallic layer of the metallized film. In other embodiments, the thermoplastic sheet may be bonded directly to the polypropylene core without a separate sealable layer. Also, a separate adhesive, such as a pressure sensitive adhesive, may be employed to facilitate the bonding of the thermoplastic sheet to either the polypropylene core or metallic layer of the metallized film.

Figure 4:
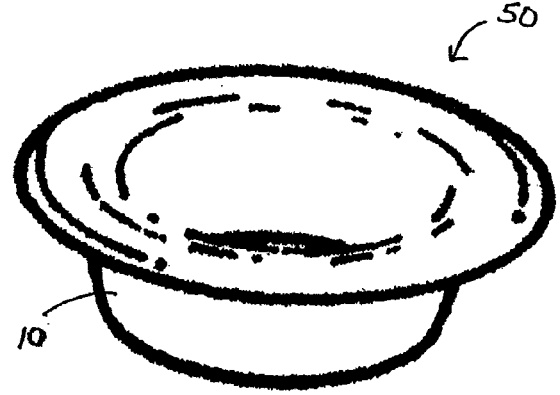
FIG. 4 is a perspective view of a container formed from the metallized laminated structure of the present invention.

The bond between the metallized film and the thermoplastic sheet of the laminate structure is strong enough to withstand additional shaping processes. For example and as shown in FIG. 4, the laminated structure may be shaped into a container 50 through a thermoforming process. The thermoformed container 50 has a mirror-like polish appearance from the metallized film and rigidity from the thermoplastic sheet. One in the art should appreciate that additional functional layers may be added to the thermoplastic sheet to achieve greater rigidity or greater barrier properties. Other layers may include known barrier materials such as ethylene vinyl alcohol (EVOH), polyvinylidene chloride (PVDC), or nylon. Also, modifiers or additives, such as clarifying agents or oxygen scavengers, may be blended or added to one or more of the layers for improving the gas barrier properties of the container or color master batch to provide varying degree of visual effect.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A laminated structure for a thermoformed article, the structure comprising:
    a metallized film including a polypropylene core have a first side and a second side, a metallic layer adjacent the first side, and a sealable layer adjacent the second side; and
    a thermoplastic sheet including at least one layer of a polypropylene and two layers of a thermoplastic olefin, wherein one layer of the polypropylene is disposed between the two layers of the thermoplastic olefin, and wherein at least a portion of the metallized film is bonded to the thermoplastic sheet.

2. The laminated structure according to claim 1, wherein at least a portion of the sealable layer is bonded to the thermoplastic sheet.

3. The laminated structure according to claim 1, wherein at least a portion of the metallic layer is bonded to the thermoplastic sheet.

4. The laminated structure according to claim 1, wherein the thermoplastic olefin has a melt index of about 2.0 and a shore hardness of about D40 and the polypropylene has a melt index of about 2.0.

5. The laminated structure according to claim 4, wherein the thermoplastic sheet has a thickness around 40 mils to around 60 mils and the metallized films has a thickness of about 1.5 mils.

6. The laminated structure according to claim 1, wherein the metallic layer includes a polyolefin-base resin and a vacuum-deposited metal coating.

7. The laminated structure according to claim 6, wherein the metal coating is aluminum.

8. A method of making a plastic article, comprising the steps of:
    extruding a thermoplastic sheet comprising at least one layer of polypropylene and two layers of a thermoplastic olefin, wherein the at least one layer of polypropylene is disposed between the two layers of the thermoplastic olefin;
    laminating a metallized film to the thermoplastic sheet at a predetermined temperature; and thermoforming the laminated thermoplastic sheet and the metallized film into a predetermined shape, wherein the thermoplastic olefin has a melt index of about 2.0 and a shore hardness of about D40 and the polypropylene has a melt index of about 2.0.

9. The method according to claim 8, wherein a thickness of the thermoplastic sheet is about 40 mils and a thickness of the metallized film is about 1.5 mils and the predetermined temperature during the lamination step is about 300° F.

10. The method according to claim 8, wherein the thermoplastic sheet has one layer of a polypropylene copolymer having a thickness of about 60 mils and a melt index of about 2.0 and the metallized film has a thickness of about 1.5 mils and the predetermined temperature during the lamination step is around 300° F. to around 335° F.

11. The method according to claim 8, wherein the step of laminating includes feeding the thermoplastic sheet and the metallized film through a roll laminator.

12. The method according to claim 8, further includes forming a metallized film by vacuum depositing a metal coating onto a polyolefin-base resin.

13. The method according to claim 8, wherein the lamination of the metallized film to the thermoplastic sheet occurs in-line with the extrusion of the thermoplastic sheet.

14. The method according to claim 8, wherein the metallized film includes a sealable layer for bonding with the thermoplastic sheet.

15. The method according to claim 8, wherein an adhesive is applied to either the metallized film or the thermoplastic sheet for bonding between the metallized film and the thermoplastic sheet.

* * * * *